United States Patent [19]

Okazaki et al.

[11] Patent Number: 4,895,822

[45] Date of Patent: Jan. 23, 1990

[54] HYDROCRACKING CATALYSTS

[75] Inventors: Hajime Okazaki, Kawasaki; Michiaki Adachi; Masaru Ushio, both of Yokohama, all of Japan

[73] Assignee: Nippon Oil Co., Ltd., Kanagawa, Japan

[21] Appl. No.: 185,835

[22] Filed: Apr. 25, 1988

[30] Foreign Application Priority Data

Apr. 24, 1987 [JP] Japan .................................. 62-101307

[51] Int. Cl.⁴ ...................... B01J 27/12; B01J 27/128; B01J 27/132
[52] U.S. Cl. ..................... 502/206; 502/204; 502/207; 502/224; 502/225; 502/226; 502/228; 502/229; 502/231
[58] Field of Search ............... 502/224, 225, 226, 228, 502/229, 231, 204, 206, 207

[56] References Cited

U.S. PATENT DOCUMENTS

| | | | |
|---|---|---|---|
| 2,953,516 | 9/1960 | Gardner | 502/228 X |
| 3,524,808 | 8/1970 | Quik et al. | 502/228 X |
| 3,692,666 | 9/1972 | Pollitzer | 502/229 X |
| 4,427,534 | 1/1984 | Brunn et al. | 502/228 X |
| 4,464,481 | 8/1984 | Hilfman et al. | 502/228 |

FOREIGN PATENT DOCUMENTS 636018  12/1978  U.S.S.R. .............................. 502/226

*Primary Examiner*—W. J. Shine
*Attorney, Agent, or Firm*—Bruce L. Adams; Van C. Wilks

[57] ABSTRACT

Hydrocracking catalysts are disclosed which comprise specified amounts of selected inorganic oxides and specified amounts of selected metal components carried thereon. The carrier is essentially derived from solid-phase modification with specified amounts of a selected class of fluorine compounds. Mineral oils are selectively processable with high catalytic activity and at maximum yield.

6 Claims, 1 Drawing Sheet

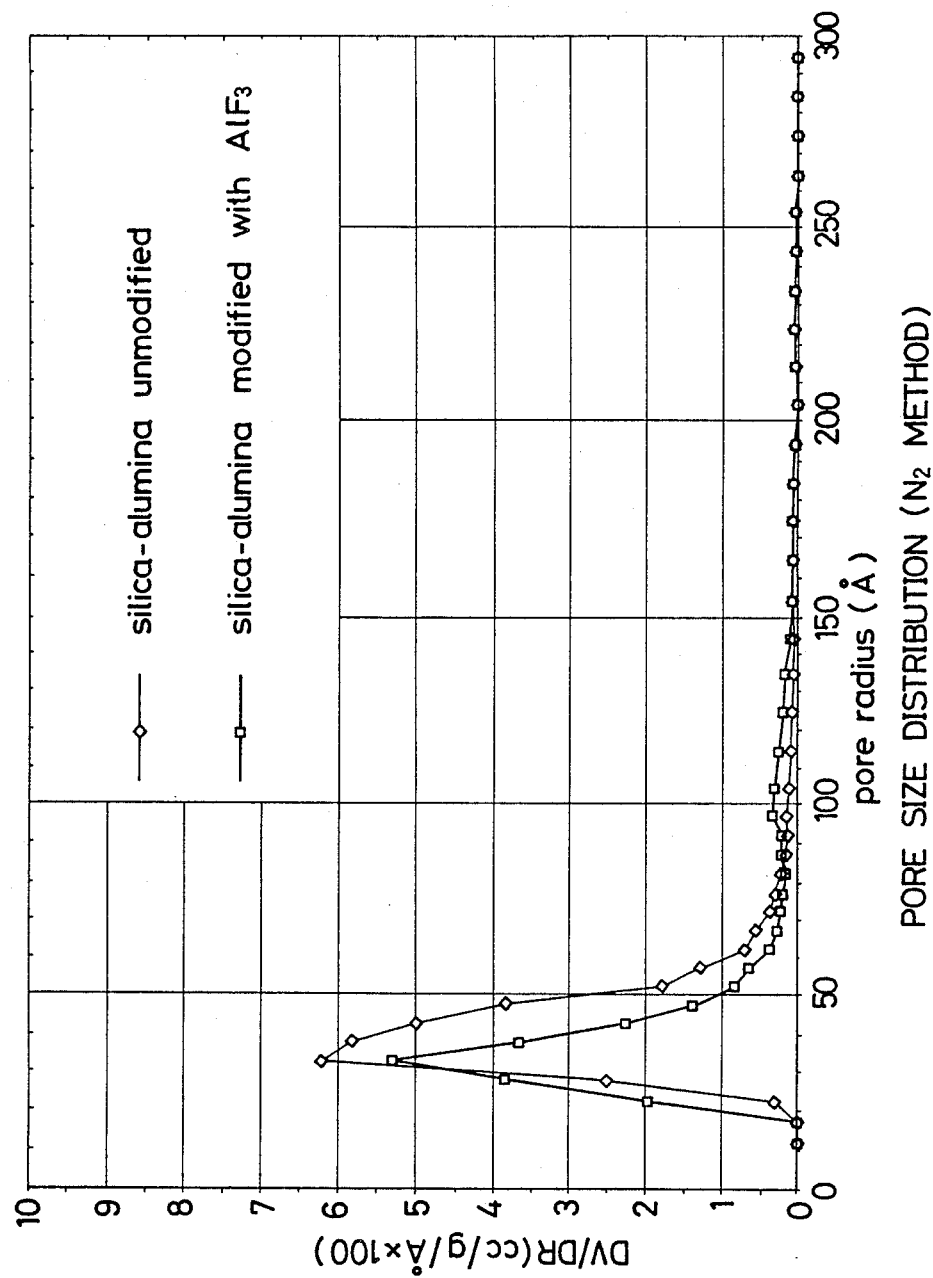

HYDROCRACKING CATALYSTS

BACKGROUND OF THE INVENTION

1. Field of the Invention

This invention relates to catalysts suitable for use particularly in the cracking of mineral oils.

2. Description of the Prior Art

Middle distillates, typified by kerosine and light gas oil, have recently been in strong and growing demand. These distillates are derived generally by atmospheric distillation of crude oil and alternatively by hydrocracking of mineral oils such as crude oil, liquefied coal gas, deasphalted oil, shale oil, vacuum gas oil, and residual oils including atmospheric residues, vacuum residues and the like.

Hydrocracked lubricant base oils have also received high credit for their greater values of viscosity index and higher rates of yield.

Hydrocracking converts mineral oils, because of their varying fractions, to a number of petroleum products by the use of many different catalysts. Most commonly employed are catalysts made up of porous inorganic oxides such as alumina and silica-alumina, and active metals of Group VI such as molybdenum and tungsten and of Group VIII such as cobalt and nickel. To attain improved hydrogenation and cleavage qualities, this catalyst system has been fluorinated by impregnation or coprecipitation in aqueous solution as disclosed for instance in Japanese Patent Publication No. 46-6507, or by deposition in gaseous phase as taught in U.S. Pat. No. 3,457,188. Such prior catalysts, however, are not wholly satisfactory as they are catalytically not so active and less selective.

SUMMARY OF THE INVENTION

The present invention turns on the discovery that catalysts of enhanced catalytic activity and selectivity characteristics can be obtained by solid-phase modification of inorganic oxide carriers with a selected class of fluorine compounds without resorting to aqueous impregnation and coprecipitation or to gaseous deposition.

It is the primary object of the invention to provide novel and improved catalysts which are highly capable of hydrocracking mineral oils with optimum selectivity and at maximum yield, thus contributing to the formation of kerosine, light gas oil and lubricant base oil of good qualities. The catalyst according to the invention is particularly useful in the treatment of atmospheric residue, vacuum gas oil, vacuum residue, liquefied coal gas, deasphalted oil, shale oil and crude oil.

Many other objects and advantages of the invention will be better understood from the following description taken in connection with the accompanying drawing in which a preferred embodiment of the invention is shown by way of illustrative example.

According to the invention, thus is provided a catalyst for use in hydrocracking mineral oils which comprises (a) a carrier resulting from solid-phase modification of at least one porous inorganic oxide with one or more solid fluorine compounds, the inorganic oxide being in an amount of 10 to 90 percent by weight of the total catalyst, the fluorine compounds being in an amount of 2.5 to 85 percent by weight of the total catalyst, and (b) at least one metal component in an amount of 5 to 50 percent by weight of the total catalyst.

BRIEF DESCRIPTION OF THE DRAWING

The accompanying drawing is a graphic representation of the pore size distributions of the catalyst provided in accordance with the present invention and of a comparative catalyst.

DETAILED DESCRIPTION OF THE INVENTION

Porous inorganic oxides useful in the present invention are materials resulting from oxidation of Groups II, III and IV elements of the Periodic Table. Typical examples include simple oxides such as alumina, silica, boria, zirconia and the like, and composite oxides such as silica-alumina, silica-magnesia, alumina-magnesia, alumina-titania, silica-titania, alumina-boria, alumina-zirconia and the like. These oxides, simple or composite, may be used alone or in combination. Alumina and silica-alumina are particularly preferred.

The amount of the oxide to be used should be in the range of 10 to 90 percent by weight, preferably 30 to 60 percent by weight of the total catalyst. The oxide has a surface area of 150 to 700 m$^2$/g and a pore volume of 0.3 to 1.5 cc/g. Where silica-alumina is used, the alumina content usually ranges from 5 to 95 percent by weight, preferably 10 to 40 percent by weight.

According to an important aspect of the invention, the inorganic oxide should be modified with one or more fluorine compounds. Eligible fluorides are in solid form and may be selected from ammonium fluoride and metallic fluorides. Specific examples of the metallic fluorides include $AlF_3$, $(NH_4)_3AlF_6$, $KF$, $CrF_2$, $CrF_3$, $CaF_2$, $CoF_2$, $SrF_2$, $FeF_3$, $CuF$, $CUF_2$, $LiF$, $NaF$, $NiF_2$, $BaF_2$, $AgF$, $AgF_2$, $UF_3$ and the like. Particularly preferred among these modifiers are $AlF_3$ and $(NH_4)_3AlF_6$.

The amount of the fluorine compound to be added should be between 2.5 and 85 percent by weight, preferably between 3 and 50 percent by weight of the total catalyst.

Active metal components used herein include for example metals classified in Groups VI and VIII. Group VI metals are typically tungsten (W) and molybdenum (Mo), whereas Group VIII metals are for example nickel (Ni) and cobalt (Co). Such metals may be used singly or put together and may be as they are or in oxide or sulfide form. Either of the two metals of both groups when employed in combination has an atomic ratio of Group VIII metal to Group VI metal in the range of 0.5:1 to 6:1, preferably 1:1 to 5:1.

The amount of the metal component to be deposited should range from 5 to 50 percent by weight, preferably 10 to 40 percent by weight, in terms of the oxide, based on the total catalyst.

In the production of the catalyst according to the invention, one or more selected inorganic oxides and one or more selected fluorine compounds are contact-molded in solid phase to give a carrier. Contact molding may be effected by blending the starting materials on any suitable known kneader and then by forming the blend by extrusion or pressure molding into a spherical, cylindrical, pellet or other suitable shape, followed by calcination at a predetermined temperature. The blend, though sufficiently extrudable with use of water, may be added with an alumina or silica sol. The sol acts as a binder, rendering the finished catalyst mechanically strong. This additive is used in an amount of 0.5 to 5 parts by weight, preferably 1 to 3 parts by weight per 10 parts of the carrier.

The resulting molded article is air-dried, dried and calcined with heat to thereby provide a desired catalyst carrier. Drying conditions are at from 50° to 250° C., preferably 90° to 150° C., for 1 to 48 hours. Calcination is carried out in a stream of air at 250° to 1,000° C., preferably 400° to 800° C., for 0.5 to 24 hours.

The catalyst carrier thus modified has now been found to possess a surface area of 100 to 700 m$^2$/g and a pore volume of 0.2 to 1.5 cc/g. This is taken to mean that the surface areas and pore volumes of modified carriers will in many instances be substantially identical to, or smaller than, those of the corresponding inorganic oxides unmodified.

Subsequently, the modified carrier is dipped overnight in an impregnating solution containing one or more selected metal components and air-dried on a filter paper for 24 hours. After being dried at 60° to 250° C. for 24 hours, the metal-deposited carrier is calcined for 30 minutes or longer at 250° to 1,000° C., preferably 400° to 800° C., with gradual temperature rise up to 250° C.

The invention contemplates hydrocracking atmospheric residue, vacuum gas oil, vacuum residue, liquefied coal gas, deasphalted oil, shale oil and crude oil. Hydrocracking conditions are at a temperature of 320° to 480° C., preferably 370° to 430° C., at a hydrogen pressure of 70 to 350 kg/cm$^2$, preferably 140 to 230 kg/cm$^2$, and at a liquid hourly space velocity (LHSV) of 0.1 to 10.0, preferably 0.1 to 2.0.

The catalyst of the invention, as shown in the drawing, has a unique pore size distribution; that is, the pore volume of an AlF$_3$-modified alumina-silica carrier is small in a region of about 40 to 80 A and great in a region of about 80 to 150 A contrasted to a similar carrier unmodified. The physical properties of the carriers appearing in the drawing are given below.

| Symbol | Inorganic Oxide | Surface Area (m$^2$/g) | Pore Volume (cc/g) | Pore Size (A) |
|---|---|---|---|---|
| ◇ | silica-alumina | 352.74 | 0.763204 | 43.2729 |
| □ | AlF$_3$— modified silica-alumina | 300.173 | 0.620588 | 41.3487 |

The following examples are provided to further illustrate the present invention, but should not be regarded as limiting the invention.

EXAMPLE 1

To 10 parts of particulate silica-alumina (Al$_2$O$_3$ content: 29%) was added 3.27 parts of aluminum fluoride, followed by kneading on an automatic mortar for 1.5 hours. The resulting mixture was combined with 26.5 parts of an alumina sol (Al$_2$O$_3$ content: 10%) and then extrusion-molded. After being air-dried overnight, the extrudate was dried at 120° C. for 2 hours and air-calcined at 500° C. for 4 hours, giving a modified carrier.

The carrier was put into an impregnating solution and disposed overnight. The solution was prepared using ammonium tungstate and nickel nitrate such that metal concentrations were 7.3% Ni and 13% W, respectively, based on the total weight of the catalyst.

The metal-deposited carrier was air-dried for 24 hours, dried at 120° C. for 24 hours and air-calcined at 550° C. for 3 hours, thereby providing Catalyst A according to the invention.

The procedure for Catalyst A was followed except that fluorination was omitted, after which Catalyst B was obtained. Catalyst C was fluorinated by simultaneously placing silica-alumina and ammonium fluoride in aqueous solution, the amount of the fluoride being similar to Catalyst A. A commercially available catalyst was used as Catalyst D. All the test catalysts were formulated with the same level of metal deposition.

Catalysts A to D were examined for catalytic activity and selectivity under the conditions given below and with the results shown in Table 1.

deasphalted oil specific gravity (15/4° C.): 0.9269
sulfur content: 1.90 wt. %
nitrogen content: 540 ppm
initial boiling point: above 540° C.

reaction temperature: 410° C.
hydrogen pressure: 171 kg/cm$^2$
LHSV: 1.0 selectivity $$\frac{\text{yield of kerosine} + \text{yield of light gas oil}}{\text{conversion of 540° C.}^+} \times 100$$

540° C.$^+$: fraction boiling above 540° C.

Catalyst A has proved quite effective in selectively hydrocracking the test oil, producing at high yield a 177°–260° C. fraction equivalent to kerosine and a 260° C.–330° C. fraction equivalent to light gas oil.

Catalyst A also enables a SAE-10 oil, whose boiling range is at 330°–460° C., to be efficiently processed as shown in Table 2. This catalyst improves viscosity index (VI) and aniline point (AP) and hence makes the resulting fraction highly paraffinic. As evidenced by ndm analysis, the catalyst excels in hydrogenating aromatic rings and also in cleaving naphthenic rings.

EXAMPLE 2

Catalysts A to D of Example 1 were applied to the treatment of vacuum gas oil under the conditions given below and with the results shown in Table 3.

vacuum gas oil specific gravity (15/4° C.): 0.922
sulfur content: 1.80 wt. %
nitrogen content: 1,000 ppm
initial boiling point: 268° C.
10 wt. % distillation point: 360° C.

reaction temperature: 380° C.
hydrogen pressure: 100 kg/cm$^2$
LHSV: 0.6
hydrogen/oil ratio: 600 Nl/l cracking activity 10 wt. % distillation point: 360° C.

$$\left(1 - \frac{\text{yield of } 360°\text{ C.}^+ \text{ (wt. \%)}}{\text{content of } 360°\text{ C.}^+ \text{ (wt. \%) in feed oil}}\right) \times 100$$

360° C.+: fraction boiling above 360° C.

selectivity $$\frac{\text{yield of kerosine} + \text{yield of light gas oil}}{\text{conversion of } 360°\text{ C.}^-} \times 100$$

360° C.−: fraction boiling below 360° C.

As appears clear from the test results, Catalyst A is highly satisfactory both in catalytic activity and in selectivity of kerosine and light gas oil.

TABLE 1

| Catalyst | Deasphalted Oil | | | |
|---|---|---|---|---|
| | A | B | C | D |
| Conversion of 540° C.+ (wt. %) | 79.9 | 67.6 | 72.0 | 69.5 |
| Yield (wt. %) | | | | |
| C1-C4 | 2.4 | 1.7 | 2.2 | 1.8 |
| C5-177° C. | 12.3 | 7.9 | 9.5 | 7.8 |
| −260° C.*(1) | 15.2 | 11.3 | 12.6 | 11.9 |
| −330° C.*(2) | 13.6 | 10.5 | 12.0 | 11.7 |
| −460° C. | 19.4 | 17.0 | 17.8 | 15.9 |
| −540° C. | 17.1 | 19.9 | 17.9 | 19.3 |
| 540° C. | 20.1 | 32.4 | 28.0 | 30.5 |
| Selectivity of *(1) and *(2) | 36.0 | 32.2 | 34.2 | 34.0 |

*(1)Kerosine
*(2)Light gas oil

TABLE 2

| Catalyst | SAE-10 Oil | | | |
|---|---|---|---|---|
| | A | B | C | D |
| VI | 118 | 112 | 113 | 105 |
| AP (%) | 106 | 102 | 105 | 102 |
| ndm Analysis | | | | |
| % CP | 71.0 | 68.5 | 69.8 | 67.5 |
| % CN | 26.6 | 27.5 | 27.2 | 28.7 |
| % CA | 2.4 | 3.9 | 3.0 | 3.8 |
| RN | 1.14 | 1.29 | 1.14 | 1.18 |
| RA | 0.10 | 0.16 | 0.12 | 0.15 |
| RT | 1.24 | 1.45 | 1.26 | 1.33 |

TABLE 3

| Catalyst | Vacuum Gas Oil | | | |
|---|---|---|---|---|
| | A | B | C | D |
| Conversion of 360° C.+ (wt. %) | 22.1 | 16.5 | 18.9 | 18.0 |
| Yield (wt. %) | | | | |
| C1-C4 | 1.8 | 2.3 | 2.7 | 2.3 |
| C5-177° C. | 3.3 | 2.7 | 3.2 | 3.0 |
| −260° C.*(1) | 6.4 | 4.3 | 5.2 | 5.3 |
| −360° C.*(2) | 20.8 | 16.4 | 17.8 | 17.3 |
| 360° C.+ | 70.1 | 75.1 | 73.0 | 73.8 |
| Selectivity of (*1) and (*2) | 84.2 | 80.5 | 79.6 | 81.0 |

*(1)Kerosene
*(2)Light gas oil

We claim as our invention:

1. A catalyst for use in hydrocracking mineral oils which comprises:
   (a) a carrier resulting from solid-phase modification of at least one porous inorganic oxide with at least one fluorine compound, said inorganic oxide being selected from the group consisting of silica, boria, zirconia, silica-alumina, silica-magnesia, alumina-magnesia, alumina-titania, silica-titania, alumina-boria and alumina-zirconia, said inorganic oxide and said fluorine compound being present in an amount of 10 to 90 percent and in an amount of 2.5 to 85 percent, respectively, by weight of the total catalyst; and
   (b) at least one metal component selected from the group consisting of a Group VI metal, a Group VIII metal and a combination thereof, said metal component being present in an amount of 5 to 50 percent by weight of the total catalyst.

2. The catalyst of claim 1, wherein said fluorine compound is at least one of an ammonium fluoride and a metallic fluoride.

3. The catalyst of claim 2 wherein said metallic fluoride is $AlF_3$, $(NH_4)_3AlF_6$, $KF$, $CrF_2$, $CrF_3$, $CaF_2$, $SrF_2$, $FeF_3$, $CuF$, $CuF_2$, $LiF$, $NaF$, $NiF_2$, $BaF_2$, $AgF$, $AgF_2$ or $UF_3$.

4. The catalyst of claim 1 wherein said Group VI metal is tungsten or molybdenum, and said Group VIII metal is nickel or cobalt.

5. The catalyst as defined in claim 1, wherein said inorganic oxide is silica-alumina or alumina-boria, or a combination thereof.

6. The catalyst as defined in claim 1, wherein said inorganic oxide is silica-alumina.

* * * * *